(12) United States Patent
Baur et al.

(10) Patent No.: US 7,158,017 B2
(45) Date of Patent: Jan. 2, 2007

(54) METHOD FOR CONTROLLING A SAFETY SYSTEM IN A VEHICLE

(75) Inventors: Richard Baur, Pfaffenhofen (DE); Yan Lu, Freising (DE); Ralph Neuberger, München (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 187 days.

(21) Appl. No.: 11/017,734

(22) Filed: Dec. 22, 2004

(65) Prior Publication Data

US 2006/0149449 A1    Jul. 6, 2006

(51) Int. Cl.
*B60Q 1/00*    (2006.01)
*B60R 22/00*   (2006.01)
*B60R 21/16*   (2006.01)
*B60D 1/28*    (2006.01)

(52) U.S. Cl. .................. 340/436; 340/438; 340/441; 701/45; 180/271; 280/734; 280/735

(58) Field of Classification Search ................ 340/436, 340/425.5, 438, 517, 522, 441, 658, 903; 701/45–47; 180/271, 268; 280/734–735, 280/728.1, 730.2
See application file for complete search history.

(56) References Cited

U.S. PATENT DOCUMENTS

| | | | |
|---|---|---|---|
| 5,164,901 A * | 11/1992 | Blackburn et al. ............ 701/47 |
| 5,445,412 A | 8/1995 | Gillis et al. | |
| 5,802,480 A * | 9/1998 | Shiraishi ....................... 701/45 |
| 6,031,484 A * | 2/2000 | Bullinger et al. ............. 342/72 |
| 6,085,151 A * | 7/2000 | Farmer et al. ............... 701/301 |
| 6,434,461 B1 * | 8/2002 | Jacob et al. ................... 701/45 |
| 6,915,196 B1 * | 7/2005 | Rao et al. ...................... 701/45 |
| 7,051,830 B1 * | 5/2006 | Enomoto .................... 180/274 |

FOREIGN PATENT DOCUMENTS

| | | |
|---|---|---|
| DE | 40 25 564 | 9/1991 |
| DE | 198 55 452 | 6/2000 |
| DE | 100 12 434 | 5/2001 |
| DE | 100 34 524 | 1/2002 |
| DE | 102 06 351 | 9/2003 |
| DE | 102 57 125 | 7/2004 |

* cited by examiner

*Primary Examiner*—Toan N. Pham
(74) *Attorney, Agent, or Firm*—Crowell & Moring LLP

(57) ABSTRACT

In a method for controlling a safety system in a vehicle, wherein an output signal of at least one impact sensor is subjected to frequency analysis in an evaluation unit which is integrated into an electronic control unit, the frequency analysis is performed in at least one predetermined frequency range, the spectrum of the output signal is compared with references patterns, the dependence of the spectrum on the present speed of the vehicle and/or the present outside temperature of the vehicle is taken into account, and a triggering signal is generated from the control unit to trigger planned protective measures if a person to be protected is detected with at least a predetermined probability.

8 Claims, 3 Drawing Sheets

METHOD FOR CONTROLLING A SAFETY SYSTEM IN A VEHICLE

BACKGROUND AND SUMMARY OF THE INVENTION

Figure 1:
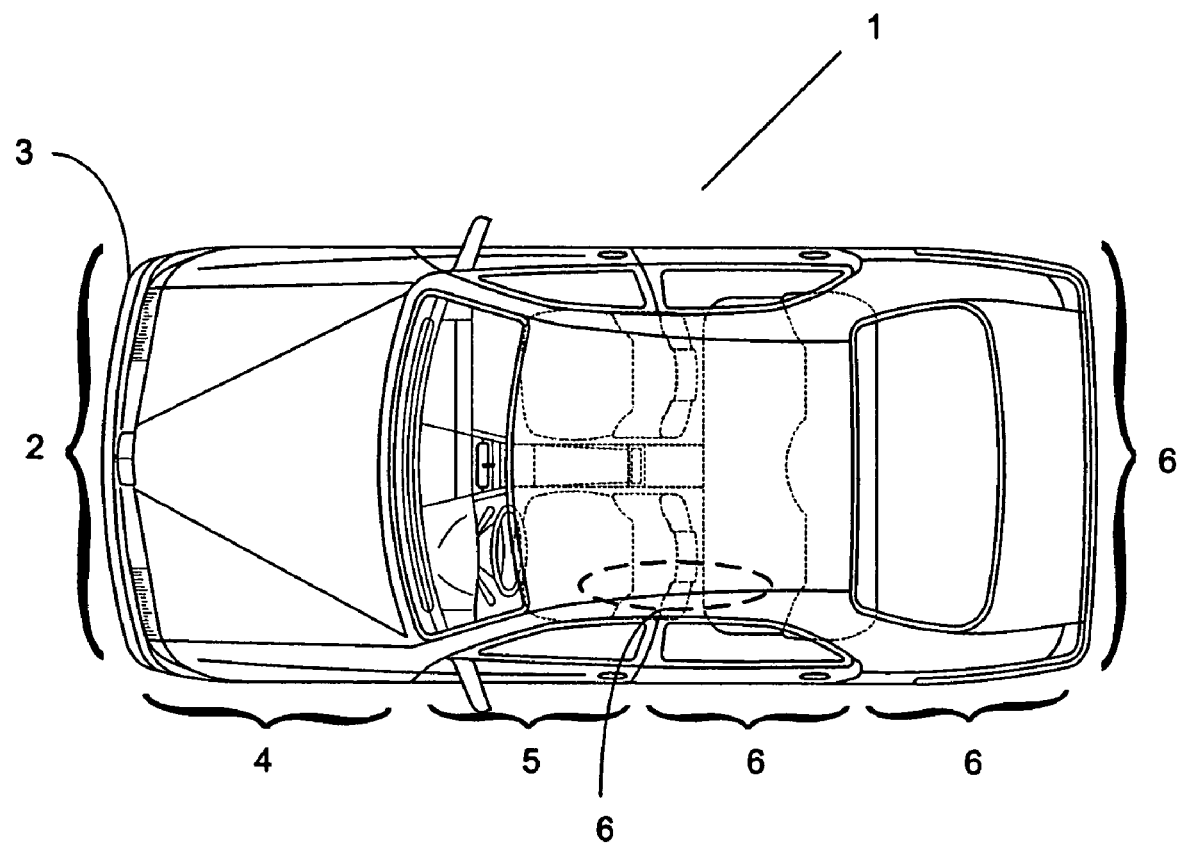

The present invention is related to a method for controlling a safety system in a vehicle and a control device.

Numerous methods and devices for controlling a safety system are known which are predominantly aimed only at the protection of the occupants of a motor vehicle using at least one impact sensor. Accordingly, an accident analysis is also usually conducted only from the standpoint of the timely activation of known occupant-protection equipment with the goal of effective absorbing the impact on occupants resulting from a change in vehicle speed due to an impact or an accident. Therefore, triggering strategies are regularly selected and implemented in the prior art on the basis of measured and/or calculated acceleration vectors in order to avoid, by the purposeful choice of occupant-protection equipment with a specifically directed effect. This is highly inadequate protection for the occupant(s) due to both too early and too late an activation of the appropriate airbags, seat belt tensioners and/or anti-rollover devices, etc. In addition to time-synchronized measurements of the transit time of signals relevant to accidents, approaches are also known for this purpose which use a large number of signal transmitters or sensors arranged in a distributed manner to locate the position of the damage and track the development of damage over time.

The starting point of these diagnoses with secondary strategies for triggering certain components of complex protection equipment is always an impact causing deformations involving at least the outer skin of a vehicle, as disclosed for example in U.S. Pat. No. 5,445,412 for a motor vehicle, and in German Patent Document DE 40 25 564 C1 for laminated fiber parts of an airplane. Methods are also known in this context in which an output signal of at least one sensor is subjected to frequency analysis, such as, for example, in German Patent Document DE 198 55 452 A1. Depending on an impact location, the spectrums caused by an impact have different effects between the front of the vehicle and the side of the vehicle due to the different bodywork structures. This property can be used for locating the site of an impact. Targeted protective measures are then triggered starting as of a predetermined accident severity that is given by an area of an envelope of the course over time of the sensor signal. In German Patent Document DE 100 34 524 A1, a defined frequency pulse is repeatedly emitted for excitation, with significant changes from a known spectrum being interpreted as an accident-caused deformation of the component or the monitored components of the vehicle. Finally, building on the use of a windowed Fast Fourier transformation for spectral analysis and evaluation of the relevance of a sensor interference signal for vehicle occupants, German Patent Document DE 100 12 434 A1 discloses a frequency analysis of the sensor signal by means of a wavelet transformation. Unlike a Fast Fourier transformation, a wavelet transformation also provides information on the occurrence in time of individual frequencies or frequency ranges.

German Patent Document DE 102 57 125 A1 describes a possible design for a sensor in the form of an piezo-electric film to detect pedestrian impact.

Methods which also offer the possibility of protecting pedestrians and/or bicyclists as early warning systems can be constructed on the basis of the methods and devices described above with only a very significantly limited maximum attainable protective effect. Based on the disclosure of German Patent Document DE 102 06 351 A1, a sensor in a particularly collision-prone area of a vehicle serves to detect a possible collision based on an initial physical contact of the vehicle with the object as a pulse-like excitation. A spectral distribution of the sensor signal with the pertinent amplitudes over the time, which is determined on the basis of a Fast Fourier transformation, can accordingly be used to distinguish between a collision with an human being and a collision with another object. Even this well-known method is not rapid enough with respect to the progress or course of an impact acting on the vehicle involved, and can have substantial weaknesses in terms of its robustness where the vehicle is coated with dirt, ice or snow and/or is hit by road debris.

It is therefore an object of the present invention to create a method with improved reliability for controlling a safety system in a vehicle that is effective for pedestrians and/or bicyclists.

In the method of the present invention for controlling a safety system in a vehicle, in which an output signal from at least one impact sensor is subjected to frequency analysis in an evaluation unit, which is integrated into an electronic control unit, the frequency analysis is performed in at least one predetermined frequency range. The spectrum of the output signal is compared with reference patterns. This takes into account the dependency of the spectrum on the current speed of the vehicle and/or on the current outside temperature of the vehicle. A control signal is generated from the control unit to trigger predetermined protective measures if an impact with a person to be protected (especially pedestrians and/or bicyclists) is detected with at least a predetermined probability.

The current velocity of the vehicle v and the outside temperature of the vehicle θ are given a special value. In both cases this involves easily measurable parameters, which are also conventionally recorded for other electronic control units in the vehicle. Vehicle velocity v is taken into account in the method of the present invention because there is a surprising influence on the sensor signal spectrum when there is a hard on soft and a soft on soft impact. It has also become known that the elements of a vehicle become less elastic as the outside temperature θ of the vehicle drops, so that a material that is soft under normal conditions reacts like a progressively harder material as the temperature drops. This is especially true for a soft outside bumper covering that is relatively soft under normal conditions. Taking at least one of these parameters into account therefore clearly increases the detection reliability of a method according to the present invention.

In a further development of the present invention, piezo-electric elements are used as sensors. The term piezo-electricity is understood to mean the property of some crystal structures to cause a charge separation on their surfaces under the effect of tension and pressure with the result that an electrical voltage can be tapped off via electrodes. With a suitable selection of material and corresponding shaping of the piezo-electric crystals, surface deformation and structure-borne noise effects can be converted over a wide frequency range into electrical signals via the associated mechanical deformations of a piezo-electric element. In addition to the use of piezo-electric crystals which can, for example, be designed as lead zirconium titanate or PZT bodies or as ceramic elements, the use of artificial piezo-electric films is well-known. The synthetics used usually involve highly polar substances which are subjected, as the film is manufactured in the warm state, to a highly static electrical field for uniform orientation of the molecules. In the course of cooling, this forced orientation of the molecules is almost solidly frozen in the film substance.

The materials mentioned above have in common that they can be used as passive sensors, with self-testing also being possible in a simple manner by making use of the reciprocity of piezo-electric materials with external active control and subsequent evaluation by a central system unit. For this purpose, the sensor element is therefore first controlled as an actuator, with the mechanical oscillation thus excited again being sensed as an electrical signal if the element is working without interference. This sensing can be performed by the sensor operated exactly as an actuator just as by at least one adjacently arranged sensor. This makes it possible for each sensor of a sensor field to be checked and monitored at any time for its operating properties with no additional expense for equipment like signal transmitters, etc.

In addition to the self-test of a particular sensor, however, a mechanical oscillation can also be imposed on a system to be safeguarded or monitored by the actuator operation, with an analysis of the oscillation created being subsequently provided by the same element with the properties of this system response being examined in an evaluation unit of the actual safety system. In addition to deformations of the material, cracks and other disturbances can also be detected in this way, especially by a frequency pattern that deviates from this system response. Thus, the present invention provides a method for operating a sensor with a reciprocal mechanism of action in a safety system, and offers the advantages of reliable self-testing. The present invention also provides the advantage of safety testing and system analysis provided at minor expense and with negligible interference in an overall mechanical system to be monitored, and with a diagnosis to complete each test. Prior damage of certain parts inside a motor vehicle can thereby be detected at any time and can be taken into account as well during the analysis of a possibly currently occurring accident, since each type of prior damage causes either a softening of parts of the frame or stiffening but in each case a deviation from unimpaired normal behavior.

In accordance with an exemplary embodiment of the present invention, a safety system comprises a large number of sensors, which are distributed over a structure to be protected as an observation area. The mechanical structure to be observed, such as for example a bumper or fender, can also be covered in a certain sense with a network of sensors, with the shape of the arrangement taking into account the particular type of mechanical structure and the location of the cluster points of possible accidental contacts with pedestrians and/or bicyclists by the way the sensors are distributed and the density of their distribution. Other points of use on a motor vehicle may, for example, also be trim work, especially in the area of the vehicle doors. Also in this arrangement, self-testing is still possible in the way described above via evaluation of a particular oscillatory reaction after an active test excitation by means of a pre-defined test signal and a recorded measurement signal. It is now also possible, by active excitation via a sensor and evaluation of the measurement signals received from all sensors, to perform a surface-covering evaluation for the analysis of errors and/or interference. All sensors can be constructed and attached in the same way, and can therefore belong to one series or one model of sensors.

Placement of the sensors with a permanently reliable attachment can be done individually or in the form of prefabricated groups at any time, even later, by embedding, adhering, screwing on, or the like, at certain points. To this end, bumpers or fenders, trim work, especially in door areas, roof areas and an engine hood and/or trunk lid are especially suitable locations on a motor vehicle for constructing a system according to the present invention.

In the event that non-harmonic oscillations develop, as, for example, in the case of impact with a foreign object or a pedestrian, precise identification of a particular event and location of its position are possible via the particular sensor elements. Accordingly, an evaluation of the intensity of the particular output signals is performed, which can be linked with a measurement of signal-transit time. Taken together, these rapidly give a reliable picture of an impact with a conclusion about the location or locations of the impact and the type of object or human being with which there has been an impact.

Suitable counter or protective measures can then be specifically triggered by subsystems which are incorporated in the safety system as a whole. This involves a targeted and precisely defined triggering of outside airbags in the area of the front of the vehicle, the windshield wiper mechanisms and/or the roof area near a rain gutter and/or a roof rail. As desired, adjustment of the hood to improve an angle of impact and to create a softer impact area with an enlarged crumple zone may also be considered. The triggering of seatbelt tensioners, various airbag systems or other active safety components can also be provided inside the vehicle in the event that danger to the occupants can no longer be ruled out. This is also regularly the case outside the range between 20 to approx. 50 kilometers an hour, for example, in accidents with wildlife, since the main impact point, especially with deer or elk, but also with large dogs, cows or horses, is still above the hood. This kind of animal therefore hits the windshield usually with no brakes being applied and very often breaks through it due to its own body weight. This poses extreme danger to the driver and any passenger so that active protective measures must be adopted here for occupants as well.

A method according to the invention is therefore also distinguished in its developments in that the use of robust, overload-resistant, cost-effective sensors that can be safely used over a wide temperature range and are capable of self-diagnosis, allows rapid and very reliable recognition of accidents with a pedestrian or bicyclist.

BRIEF DESCRIPTION OF THE DRAWING FIGURES

Figure 2:
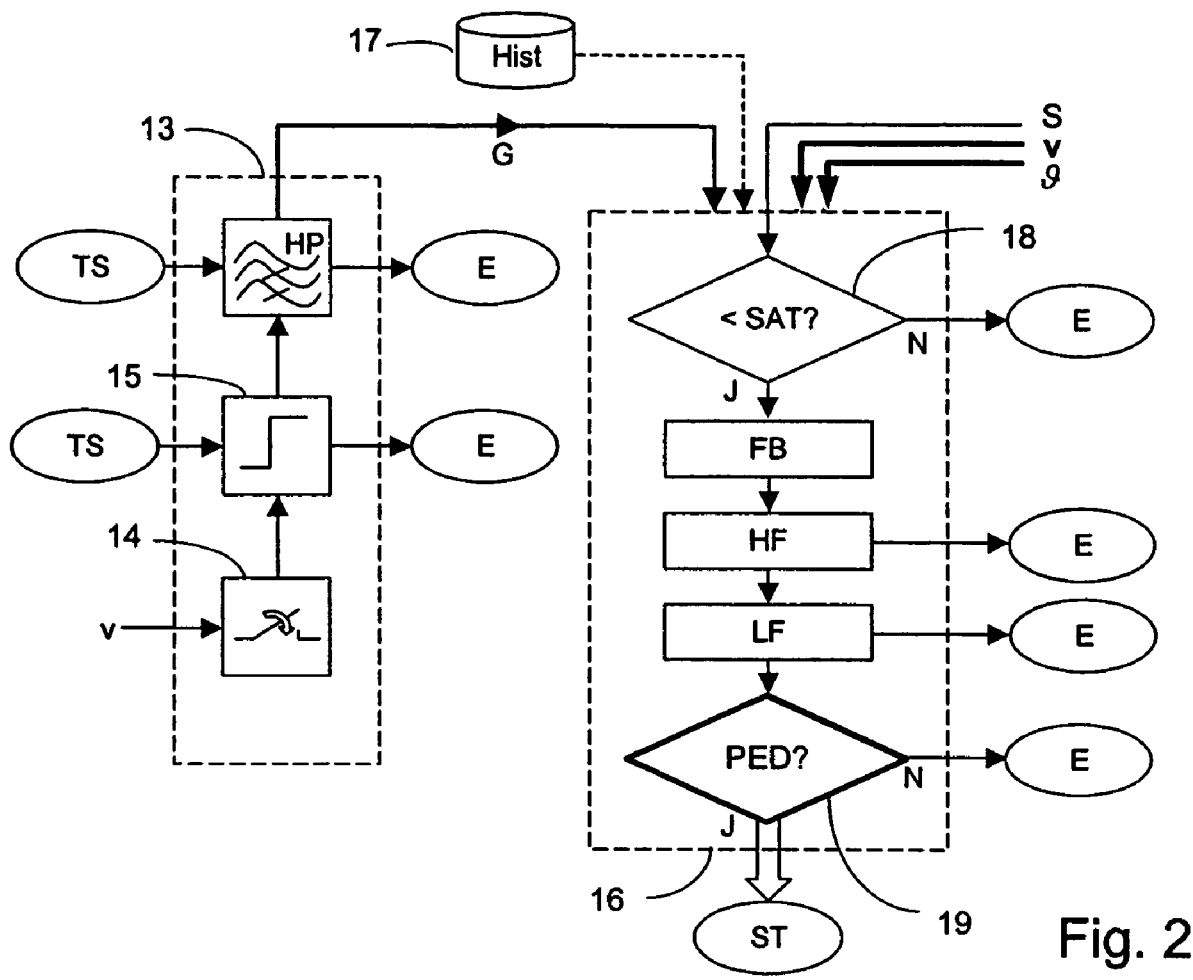
Figure 3:
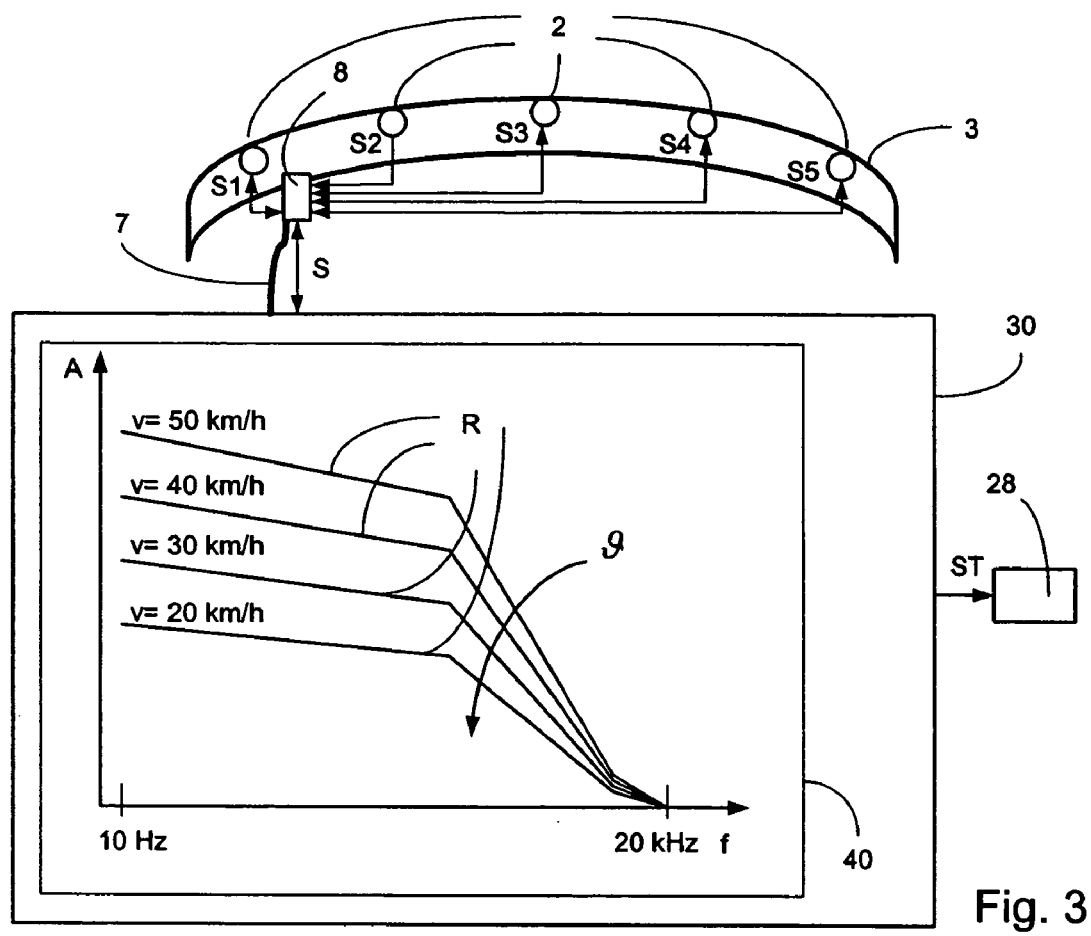
Figure 4:
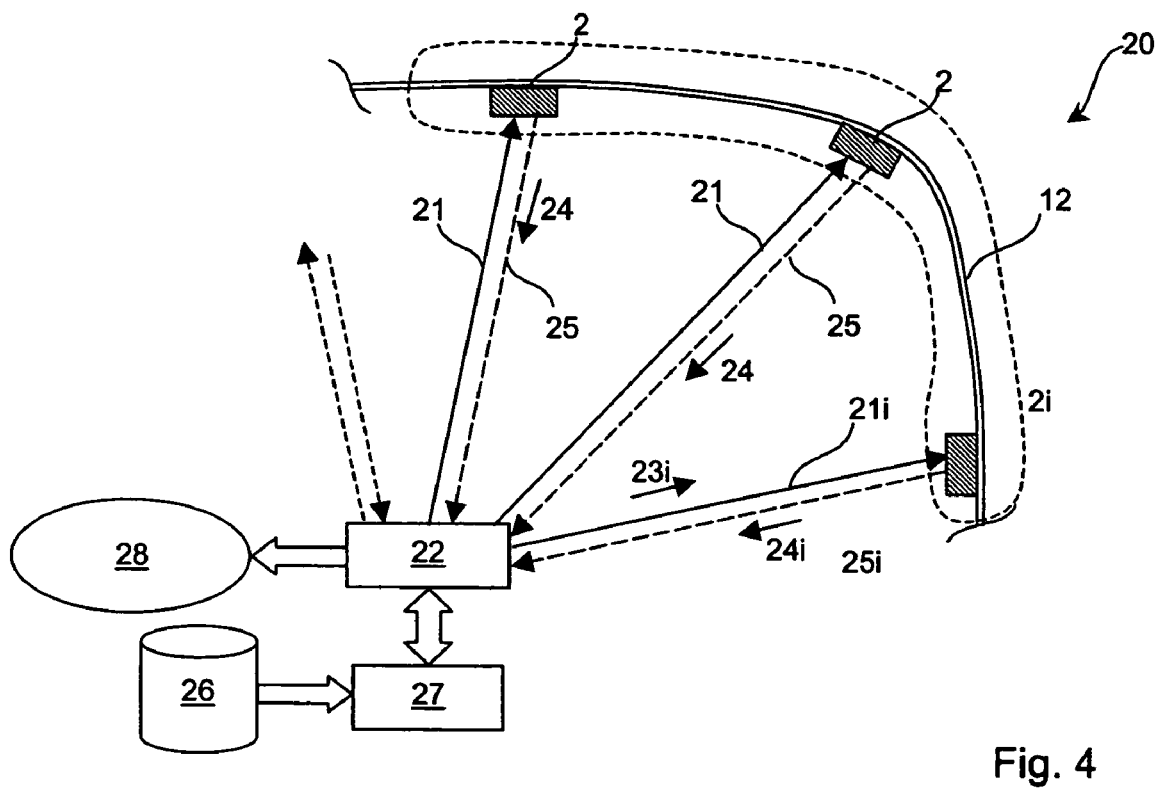

Further advantages of the invention are described in more detail below using embodiments with reference to the figures in the diagram, in which:

FIG. 1: shows a diagram of a safety system according to the present invention on a bumper of a motor vehicle with further areas of use being indicated in a top view;

FIG. 2: shows a possible area of use for the invention in a particularly advantageous general safety system in the form of a flow chart;

FIG. 3: shows a diagram of the core of the invention as it can be implemented, for example, in block 19 in FIG. 2;

FIG. 4: shows a diagram of a system in which a method according to FIGS. 2 and 3 can be implemented.

The same reference numbers are used uniformly for the same elements in the figures below.

DETAILED DESCRIPTION

FIG. 1 shows a diagram of a motor vehicle 1 which is equipped with sensors 2 (not shown here in detail) of a safety system according to the present invention in a bumper or fender 3. In accidents involving a pedestrian or bicyclist, fender 3 is usually the point at which the initial impact takes place. In a side impact, this initial contact can also take place at a left or right fender 4 or a driver's or passenger's door 5. Further areas of use 6 for sensors 2 of a safety system according to the present invention have been indicated by curved brackets in the top view for half of motor vehicle 1.

FIG. 2 shows a flow chart of an embodiment into which the method of the present invention can be integrated. An initial block 13 represents the processing of a triggering signal TS which comes from the sensor 2 that first becomes sufficiently deformed due to an impact. This is also called the trigger sensor signal. The prerequisite for processing triggering signal TS is, however, that vehicle 1 is itself moving at a velocity of approx. 20 to approx. 50 kilometers an hour. Otherwise velocity switch 14 does not close and the procedure does not take place. As another prerequisite, a threshold value is preset in function block 15 for the intensity of the output signal of any sensor 2 affected by an impact. If this preset value is not reached and/or exceeded, the procedure also ends at this point.

Only when the intensity of the output signal TS exceeds the preset intensity does a high-pass filtering of the signal TS take place. This high-pass filtering makes sure that very gentle impacts which might come, for example, from striking boxes, cardboard containers or pieces of foam, low-frequency noise, electromagnetic capacitance at 50 or 60 Hz, engine vibrations at engine speeds of approx. 6000 min-1 and impacts not frontal to fender 3 and the muffled striking of road bumps and/or uneven pavement, are not seen by the procedure portrayed in the initial step just described and are disregarded as irrelevant cases. Roadway-induced vehicle vibrations essentially only have low-frequency signal components in the case of pavement, cross grooves, grade crossings and potholes which are filtered out by the upstream high-pass filtering HP of signal TS to preclude erroneous triggering of the procedure. Such excitations are indeed recognized as irrelevant in the multistep analysis and evaluation method described below, but the high-pass filtering HP of signal TS advantageously abbreviates the recognition path and thus leads generally to a substantial savings in time which also guarantees unlimited availability of the total procedure even in the event of signals TS occurring in rapid succession.

The first block 13 thus excludes a whole number of possible sources for erroneous or unnecessary triggering of pedestrian and/or bicyclist protection functions as a first step of the overall procedure. Only if the vehicle is moving within the preset range of speed and the signal TS is strong enough and has sufficiently high-frequency and higher-frequency components, is a second block 16 activated by a signal G as the starting signal for a detailed analysis and evaluation with respect to certain properties. Output signals S of all sensors 2 are then sent to block 16 over separate lines or over a bus along with an indication of current vehicle velocity v and outside vehicle temperature θ. Information on the vehicle history can also be loaded via databank 17. In this way, previous damage to certain parts or components of vehicle 1 can also subsequently be taken into account.

In second function block 16, a check is now performed in a second step in block 18 to see whether output signal S from one of sensors 2 is in a saturation range. Each sensor 2 is normally operated clearly outside its saturation range. But if at least one sensor 2 is in the saturation range, it can be assumed that there has been an impact from an object such as, for example, a collision with another vehicle, a wall or another massive barrier, a steel traffic light post, etc. in the area of the affected sensor 2. An accident with a pedestrian or bicyclist can therefore certainly be excluded.

Now, in the event that none of output signals S from sensors 2 is in the saturation range, each of signals S is fed to filter bank FB. Filter bank FB calculates the Fourier coefficients of the analogous signals for predetermined frequencies or even approximate frequency windows. In a third step, signals S are examined for their high-frequency components. Values under the threshold value denote gentle impacts on vehicle 1 in the area of sensors 2 which could come, for example, from a trashcan or a football. If the high-frequency component of a signal S exceeds a preset threshold, however, this denotes an impact from a hard object, and therefore not an accident with a pedestrian or bicyclist whose body is considered "soft" in the method of the present invention.

An examination is then performed of lower frequency components of sensor output signals S in the form of an estimate of low-frequency signal components. Here values below a threshold value identify a clanging impact such as results from the impact of a stone or debris. With low-frequency signals below a threshold value, an accident with a pedestrian or bicyclist is therefore again very unlikely. Conversely, exceeding the preset threshold value of this fourth step in the procedure makes a collision with a pedestrian or bicyclist very probable.

In a fifth and final step, there is another plausibility test in function block 19 for pedestrian recognition. This kind of plausibility test comprises statistical examinations, which further increase the possibility of a correctly recognized accident with a pedestrian or bicyclist, with a pattern comparison being used (see also FIG. 3). In this step, frequency components of signals S are compared with those of known pedestrian reference signals R which have been obtained under realistic conditions using pedestrian models or mock-ups. The frequency content for each impact is compared with that of one or more impact objects. The starting value is subjected to a threshold value examination with a threshold value of approx. 0.8 as the value for the probability of an impact from a pedestrian or bicyclist.

Ending E of the procedure described is usually possible after each separate decision-making step according to the diagram in FIG. 2. A final plausibility test with a pattern comparison and statistical examinations to determine a probability value is only performed when the preceding subtests of steps 1 through 4 have been passed successfully. In this process, it is determined with progressive certainty that an impacting object is essentially similar in terms of its rigidity to, for example, the leg of a pedestrian.

When the procedure described is completed, the total system time is only 8 ms, which is made up of 5 ms of signal acquisition time and only 3 ms of signal calculation time. The use of analogous circuit components is an essential contribution to time savings. If it is assumed that initial contact with a pedestrian or bicyclist is made in the area of fender 3, the system can therefore be triggered as a safety measure for injury reduction as soon as 8 ms later via control signal ST to fire an outside airbag and/or to adjust the hood, etc. It is estimated, e.g., in FIG. 10b of German Patent Document DE 102 06 351 A1, that the impact of the head and/or upper body does not take place until roughly 200 ms after initial contact. By that time, known protective devices can already have been specifically selected, triggered and put into a state of optimal development of protection for a pedestrian or bicyclist by an analytical procedure described above.

FIG. 3 shows a diagram of fender 3 in a frontal view. Here sensors 2 are drawn in as circular white dots to illustrate their number and distribution. The five sensors 2 in a linear arrangement in this example are in reality not visible however; their presence is indicated only by a data or signal cable 7 carrying output signals S1 through S5 from sensors 2, optionally with an intermediate collector module 8.

Output signals S1 through S5 or (as shown here) the strongest output signal S of output signals S1 through S5 are, or is, fed to evaluation unit 30. This evaluation unit 30 may for example perform the entire procedure in accordance with FIG. 2. Evaluation unit 30 contains a pedestrian-recognition unit 40 which may, for example, correspond to block 19 of the overall procedure shown in FIG. 2.

Output signal S1 through S5 or output signal S are, or is, compared with patterns or reference curves R stored in pedestrian-recognition unit 40, with the vehicle velocity v and vehicle outside temperature θ being preset as parameters. Frequency f is plotted on the abscissa and amplitude A on the ordinate. In this example, reference patterns R predetermine comparison spectrums for four different vehicle velocities v which can be interpolated for intermediate values of the present vehicle velocity v. However, comparison spectrums can also be defined for different velocity ranges. Amplitude A of reference curves R increases as vehicle velocity v increases and decreases as outside temperature θ increases.

If a match within defined tolerance areas is found between output signal S and a pattern depending on vehicle velocity v and vehicle outside temperature θ, i.e., if for example a pedestrian or bicyclist is recognized with a predetermined probability, control signal ST is sent to actuator 28, for example, to raise the hood in connection with measures for pedestrian impact protection.

FIG. 4 shows a diagram of safety system 20 in which a procedure according to FIGS. 2 and 3 is implemented. Safety system 20 comprises a large number of sensors 2 which are arranged on fender 3 of vehicle 1, the fender being shown only as an extract. In the case at hand, sensors 2 are covered on the outside by outer skin 12 and attached by adhesion to the carrier which is not shown in detail. Each sensor 2 is connected to a central system unit 22 by signal cable 21. Signal cable 21 serves as a feeder for a diagnosis signal and/or excitation signal 23, which is converted by the particular sensor 2 into a mechanical signal. This makes sensor 2 a reciprocal-action converter, in this case a piezo-electric converter. Thus, when a given sensor 2$i$ is triggered by excitation signal 23, reaction signal 24$i$ can be returned over return line 25$i$ of this sensor 2$i$ to the central system unit 22. The reaction signal 24$i$ of each sensor 2$i$ triggered shows that the sensor 2$i$ involved has been able to be electrically addressed and has reacted mechanically, with this reaction being able to be electrically converted back again. This reaction signal 24$i$ therefore serves as a simple self-test.

An evaluation of reaction signal 24$i$ also gives further information on the functional capacity of the involved sensor 2$i$. Each of the sensors 2 is therefore capable of self-diagnosis according to the same test system, with no additional devices. Central system unit 22 is designed for routinely performing such self-testing for all sensors 2 of safety system 20 and for evaluating the particular reaction signals 24 received for the particular sensors 2 which are triggered.

The mechanical system response of sensor 2 to excitation signal 23 of central system unit 22 is propagated by the rigid coupling of sensor 2 in the form of a mechanical wave. Due to the signal propagation over the triggering range, other reaction signals 24 of other sensors 2 are also sent to the central system unit over the particular return lines.

By distributing a large number of sensors 2 over the area here shown only by way of example, the safety system 20 shown still, however, has expanded detection and analysis capacities: each of sensors 2 has it own signal line 21 and its own return line 25. The particular excitation signals 23 can therefore be used specifically and the reaction signals 24 can be clearly assigned to a particular sensor 2 and thereby connected with a certain position. Each piezo-sensor 2 is considered in itself to be capable of self-diagnosis so that safety system 20 is also capable of self-diagnosis as a whole since it is constructed as a flexibly expandable network on the basic building blocks of robust and cost-effective piezo-sensor elements 2.

When excitation signal 23 is sent out by central system unit 22 to a sensor 2$i$, all sensors 2 send their own reaction signals 24 over the assigned return lines 25 to the central system unit 22. In addition to monitoring the readiness for use of piezo-electric sensors 2 for error analysis, this allows general monitoring of the mechanical properties of a component to be monitored and a damage check by an evaluation of reaction signals 24 in central system unit 22. For this purpose, central system unit 22 is connected with databank 26 and model 27 of a particular monitoring area. Databank 26 lists the characteristics recorded during problem-free operation and in an intact state for reaction signals 24 of the particular sensors 2 as a function of each sensor 2 as an exciting actuator. The distributions of the particular sensors 2 over the monitoring area are placed in model 27. By connecting central system unit 22 with databank 26 and model 27, deviations from the normal behavior of each sensor 2 can now be determined and assigned to one or more sections of the monitoring area based on model 27. Attachments and even slight bulges change the mechanical oscillation properties significantly. These changes can now be compared by comparisons with an interference-free system response so that areas with attachments or just previous damage can be specifically identified and indicated in the result. This is significant since coatings of ice, snow or mud, etc., can cause operational interference. Examinations of the type indicated are of course also expanded to other mechanically bearing elements and connections of the chassis.

Sensors 2 are designed individually or in groups in an alternative form not shown further here in such a way that they can be connected directly to bus lines of a uniform bus system. This reduces the internal wiring in each group even further, with the system architecture becoming even more manageable.

The methods described above for operating one or more sensors in a safety system build on a specific mechanical excitation triggered internally to the system by central system unit 22. Static interference is hereby detected by safety testing. In particular, a function impairment or other disturbance does not itself have to have a sound-emitting course. The system 20 described above may also be used for recognition and analysis in the case of dynamic and/or non-harmonic external excitations. These kinds of extreme oscillatory excitations are caused, for instance by deformations of parts, and radiate into a monitoring area if they do not run out inside the monitoring area. By the nature of their propagation they supply both a particular frequency pattern and strong signs of disturbance caused by foreign contact. Examples of such foreign contact in the form of accident-caused contacts with a pedestrian or bicyclist or crashes connected with a collision with a vehicle have already been given above.

The invention claimed is:

1. A method for controlling a safety system in a vehicle, wherein an output signal of at least one impact sensor is subjected to frequency analysis in an evaluation unit, which is integrated into an electronic control unit, wherein the frequency analysis is performed in at least one predetermined frequency range, a spectrum of an output signal is compared with references patterns, the dependence of the spectrum on the present velocity and/or the present vehicle outside temperature (/) is taken into account, and a triggering signal is generated from the control unit to trigger planned protective measures if a person to be protected is detected with at least a predetermined probability.

2. The method according to claim 1, wherein by making use of substances with a reciprocal action as sensors, cyclic operational tests or self tests are performed by using a sensor as an actuator to excite a mechanical system and evaluating reaction signals, taking into account in particular a history of accident-caused previous damage to certain areas and/or elements of the vehicle.

3. A device for controlling a safety system in a vehicle, comprising:
    at least one sensor;
    an evaluation unit, coupled to an output of the at least one sensor, to supply output signals, the evaluation unit performing a frequency analysis with respect to the output signals and being integrated into a control unit,
    wherein the evaluation unit and the control unit perform the frequency analysis in at least one predetermined frequency range, the spectrum of the output signals are compared with reference patterns, dependence of the spectrum on the current velocity of the vehicle and/or the current outside temperature of the vehicle are accounted for, and a triggering signal is generated to trigger planned protective measures if an impact with a person to be protected is detected with at least a predetermined probability.

4. The device according to claim 3, wherein the evaluation unit or the control device uses substances with a reciprocal action as sensor bodies, cyclic operational tests or self tests can be performed by using a sensor as an actuator to excite the mechanical system and evaluating reactions signals, taking into account in particular a history of previous accident-caused damage to certain areas and/or elements.

5. The device according to one of claim 4, wherein the device comprises a network of sensors, which are distributed over an observation area, and which are each connected by their own separate signal lines and return lines with a central system unit and which are grouped together.

6. The device according to one of claim 3, wherein the device comprises a network of sensors, which are distributed over an observation area, and which are each connected by their own separate signal lines and return lines with a central system unit and which are grouped together.

7. A method for controlling a safety system of a vehicle based on frequency analysis, comprising the acts of:
    filtering a sensor signal to produce a signal in a predetermined frequency range;
    comparing the signal in the predetermined frequency range with a reference pattern;
    accounting for a vehicle velocity and/or outside temperature in the frequency analysis; and
    generating a safety system control signal when a person to be protected is, based on the frequency analysis, detected with at least a predetermined probability.

8. The method of claim 7, comprising the acts of:
    performing test using reciprocal action sensors to excite a mechanical system; and
    accounting for a history of accident-caused previous damage to certain areas and/or elements of the vehicle.

* * * * *